United States Patent [19]
Wesdorp et al.

[11] Patent Number: 5,620,734
[45] Date of Patent: Apr. 15, 1997

[54] SPREADS AND OTHER PRODUCTS INCLUDING MESOMORPHIC PHASES

[75] Inventors: Leendert H. Wesdorp, Ellicott City; Keith D. Brilhart, Baltimore, both of Md.

[73] Assignee: Van den Bergh Foods Co., Division of Conopco, Inc., Lisle, Ill.

[21] Appl. No.: 661,857

[22] Filed: Jun. 13, 1996

Related U.S. Application Data

[63] Continuation of Ser. No. 262,198, Jun. 20, 1994, abandoned, which is a continuation of Ser. No. 952,452, Sep. 28, 1992, abandoned, which is a continuation-in-part of Ser. No. 846,311, Mar. 5, 1992, abandoned.

[51] Int. Cl.$^6$ ................................................. A23D 7/015
[52] U.S. Cl. ............................ 426/601; 426/602; 426/604
[58] Field of Search ..................................... 428/601, 602, 428/604

[56] References Cited

U.S. PATENT DOCUMENTS

| | | |
|---|---|---|
| 3,026,207 | 3/1962 | Murray . |
| 3,180,736 | 4/1965 | Landfried . |
| 3,282,705 | 11/1966 | Hansen . |
| 3,379,535 | 4/1968 | Landfried . |
| 3,502,482 | 3/1970 | Birnbaum . |
| 3,592,660 | 7/1971 | Neu . |
| 3,800,036 | 3/1974 | Gabby ................................ 426/164 |
| 3,809,764 | 5/1974 | Gabby et al. . |
| 3,949,102 | 4/1976 | Hellyer et al. . |
| 4,226,890 | 10/1980 | Howard . |
| 4,351,852 | 9/1982 | Rule et al. . |
| 4,400,405 | 8/1983 | Morley et al. . |
| 4,424,237 | 1/1984 | Wittman, III . |
| 4,668,519 | 5/1987 | Dartey . |
| 4,770,892 | 9/1988 | Grealy et al. . |
| 4,772,483 | 9/1988 | Nolte . |
| 4,788,075 | 11/1988 | Joseph et al. . |
| 4,873,094 | 10/1989 | Pischke et al. . |
| 4,877,625 | 10/1989 | Dieu et al. . |
| 4,978,554 | 12/1990 | Larsson et al. . |
| 5,080,921 | 1/1992 | Reimer . |
| 5,082,684 | 1/1992 | Fung . |
| 5,106,644 | 4/1992 | El-Nokaly ........................... 426/603 |
| 5,120,561 | 6/1992 | Silva et al. . |
| 5,139,803 | 8/1992 | Haynes ................................ 426/330.6 |
| 5,158,798 | 10/1992 | Fung et al. . |
| 5,308,639 | 5/1994 | Fung . |

FOREIGN PATENT DOCUMENTS

| | | |
|---|---|---|
| 1180250 | 1/1985 | Canada . |
| 0063468 | 4/1982 | European Pat. Off. . |
| 0098664 | 7/1983 | European Pat. Off. . |
| 0268974 | 11/1987 | European Pat. Off. . |
| 0279498 | 2/1988 | European Pat. Off. . |
| 0454366 | 1/1991 | European Pat. Off. . |
| 547647 | 6/1993 | European Pat. Off. . |
| 1354142 | 11/1962 | France . |
| 2269368 | 4/1975 | France . |
| 1539625 | 6/1975 | France . |
| 1539625 | 1/1979 | France . |
| 2935572 | 9/1979 | Germany . |
| 90/267450 | 7/1992 | Japan . |
| 8402867 | 4/1986 | Netherlands . |
| 1104955 | 5/1965 | United Kingdom . |
| 1174672 | 1/1970 | United Kingdom . |
| 1265661 | 3/1972 | United Kingdom . |
| 1346581 | 1/1974 | United Kingdom . |
| 1501106 | 2/1978 | United Kingdom . |
| WO91/0016 | 1/1901 | WIPO . |
| WO87/02582 | 5/1987 | WIPO . |
| WO90/09107 | 8/1990 | WIPO . |
| WO91/18514 | 12/1991 | WIPO . |
| WO92/09209 | 6/1992 | WIPO . |
| WO93/09682 | 5/1993 | WIPO . |

OTHER PUBLICATIONS

Distilled Monoglycerides, Food Engineering, vol. 34(11), pp. 97–100, Nov. 1962, G.H. Doerfert.
Lutton, *Phase Behavior of Aqueous Systems of Monoglycerides*, J.A.O.C.S., vol. 42, 1965 p. 1069.
Derwent Abstract—DE 2935572.
"Microemulsions and Emulsions in Foods," ACS Symposium Series 448, El Nokaly, ed., pp. v–vii and 44–50 1990.
Larsson, "Some Effects of Lipids on the Stucture of Foods," *Food Microstructure*, vol. 1, No. 1, 1982.
S. Friberg, *Food Emulsifiers*, 1976, Marcel Dekker, Ch. 3 (N. Krog et al.) and Ch. 4 (K.G. Berger), pp. 67–213.
F. D. Gunstone, "The Lipid Handbook," 1986, Chapman & Hall, London, ed.
J. Sci. Fd. Agric., vol. 24, No. 6, Jun. 1973, N. Krog et al.: "Swelling Behavior of lamellar phases of saturated monoglycerides in aqueous systems."
*Food Hydrocolloids*, vol. 3, No. 4, 1989, Hatakeyama et al.: "Mesomorphic Properties of Highly Concentrated Aqueous Solutions of Polyelectrolytes from Saccharides".
The Bakers Digest, vol. 52, No. 1, 1978–02, H. Birnbaum, "Surfactants and Shortenings in Cake Making".
J. Fd. Technol. (1970) 5, N. Krog et al.: "Interaction of monoglycerides in different physical states with amylose and their anti-firming effects in bread".
The Bakers Digest, Aug. 1961, B. D. Buddemeyer et al.: "The Role of Stearyl-2 Lactic Acid in Chemically Leavened Baked Products".
JAOCS, vol. 66, No. 4, Apr. 1989, V. F. Rasper et al.: "Emulsifier/Oil System for Reduced Calorie Cakes".
Bailey's Industrial Oil and Fat Products, vol. 3 (1985), Chrysam et al.
Cereal Chemistry, vol. 58, No. 3, 1981, N. Krog: "Theoretical Aspect of oSurfactants in Relation of Their Use in Breadmaking".
Water Relations of Foods, R. B. Duckworth, ed. (Academic Press, 1975).

*Primary Examiner*—Carolyn Paden
*Attorney, Agent, or Firm*—Gerard J. McGowan

[57] ABSTRACT

Mesomorphic phases of edible surfactants can advantageously be added to food products to provide for example structuring or fat-replacement. Preferably the mesomorphic phases are present as bulk phases in finished or ready to eat food products. The compositions include lactose.

15 Claims, No Drawings

SPREADS AND OTHER PRODUCTS INCLUDING MESOMORPHIC PHASES

This application is a continuation of U.S. Ser. No. 08/262,198, filed Jun. 20, 1994 now abandoned which is a continuation of U.S. Ser. No. 07/952,452 filed Sep. 29, 1992, which is a continuation-in-part of U.S. Ser. No. 07/846,311 filed Mar. 5, 1992, now abandoned.

FIELD OF THE INVENTION

The present invention relates to the use of mesomorphic phases of edible surfactants, particularly in spreads.

BACKGROUND AND SUMMARY OF THE INVENTION

According to the general prior art the structuring of foodstuffs can be accomplished in various ways. Two main routes can be distinguished:

(1) the structuring by biopolymers such as proteins and carbohydrates, and (2) the structuring by "particles" in the widest sense.

In the former case polymeric molecules cross-link to form a tangled, interconnected molecular network in water. In those systems the presence of junction zones or entanglements leads to gel formation and the enclosure of water. Examples of those polymeric substances are starch in puddings, gelatin in desserts and in the water phase of fat spreads, pectin in jams, carrageenin in desserts and in the water phase of fat spreads, and many others.

In the second case entities such as air cells, water droplets, fat droplets, crystals, starch granules or casein micelles are dispersed into the food system. Interaction forces between such particles determine the consistency and the physical stability of the food products. Many food systems fall into this category. In yoghurt aggregated protein particles form a network of protein strands. In mayonnaise an "interconnected" structure of oil droplets is responsible for its consistency. In a shortening fat crystals form an interconnected network structure enclosing oil. In a margarine water droplets are dispersed into a continuous network structure of fat crystals and oil. So, this represents a dispersion of particles in a network of particles. Even more complicated structures are found in butter and ice cream. But in all those cases a build-up of structure from particles of particle networks can be distinguished, which is responsible for the consistency of the finished products.

Heertje et al. WO 92/09209 published Jun. 11, 1992 discloses finished foodstuffs containing mesomorphic phase of edible surfactants as a structuring agent or fat replacer. The formation of mesomorphic phases of edible surfactant molecules and water can give rise to a firm texture and consistency. The use of this property of mesomorphic phases, to give consistency to products, is new to the food business. However, it should be noted that this use may already be known in other areas such as cosmetics and pharmaceuticals.

This new way of product structuring may be described e.g. as a regular, molecular arrangement of surfactant molecules with intervening aqueous regions. For the purpose of the invention the term mesomorphic phase is intended to include all semi-ordered phases of water and edible surfactant materials. Examples of mesomorphic phases are cubic, hexagonal, alpha crystalline gel, beta-crystalline coagel and lamellar phases. Preferred mesomorphic phases for use in accordance with the invention are lyotropic phases; also preferred are lamellar phases. For the purpose of the present invention, the term lamellar phase refers to system having a pattern of alternating bilayers of edible surfactants and water. Examples of lamellar phases are lamellar droplet phases, lamellar gel phases and lamellar phases containing extended parallel layers of surfactants and water.

In the lamellar phase surfactants are believed to form a bilayer structure. It is believed that a bulk lamellar phase consists of stacks of bi-layer structures with an intervening aqueous phase. Products according to the present invention preferably comprise bulk regions of the lamellar phase whereas it has been suggested that known products of the prior art might contain boundary layers of this phase at interfaces, such as those found around oil-droplets in water-continuous fatty products.

The bulk lamellar phase may be formed by temperature cycling of a mixture of surfactant and water. In the crystalline state, the surfactant molecules are oriented with adjacent hydrophillic groups and the hydrophobic chains are parallel and densely packed. On contact with water and heating to the so-called 'Krafft' temperature it is believed that water penetrates between the adjacent 'head' groups to form a 'liquid crystal' structure. On cooling below the 'Krafft' temperature, the hydrophobic chains pack into a regular lattice, producing a one-dimensionally periodic 'sandwich' structure of alternating surfactant and aqueous layers.

As an example of the 'gel' structure obtained: for a mixture of water and a distilled monoglyceride made from fully hydrogenated lard, which has been cycled above the Krafft temperature, X-ray diffraction in the low-angle region reveals that the thickness of the monoglyceride layers is of the order of 50–60 Angstrom. As the proportion of water in the mixture in the system is increased the inter-planar spacing increases, as water is taken up between the monoglyceride layers. It will be realised that the fine structure of the mesomorphic phase, especially as regards the inter-planar spacing, will vary when different surfactants are used.

Another preferred mesomorphic phase according to the invention is a beta-crystalline coagel, which is believed to consist of small plate-like crystals having an average thickness of less than 1 fm or even less than 0.1 fm, said platelets being dispersed in an aqueous environment. This is a suspension of beta-crystalline emulsifier in water and is also known as a 'hydrate'. These coagels may be formed instead of an alpha crystalline gel phase under certain conditions, such as at acid pH. Both the above mentioned alpha gels and these hydrates are used extensively in the baking industry as crumb softening agents in wheat bread and as cake volume improvers, but it is believed that the structure of the mesomorphic phase is lost during product preparation and consequently that the finished foodstuff (be it bread or cake) does not contain bulk mesomorphic phase. In the context of the invention the coagel phase is considered a semi-ordered phase of water and edible surfactant (mesomorphic phase).

The presence of mesomorphic phases in food products may be detected by any method suitable for the detection of regular arrangements of surfactant materials. Suitable methods include for example NMR, Electron microscopy, Differential scanning calorimetry, light microscopy and X-ray diffraction.

The use of mesomorphic phases of edible surfactants as structuring agent can lead to many useful applications, such as the use as fat replacer, foaming agent, egg white replacer, preservative, lubricating agent, consistency control agent, moisture retention agent and/or flavour release agent in foodstuff. A finished foodstuff may contain a mesomorphic phase of edible surfactant and less than 80% by weight of edible oil.

The present invention relates to the use of mesomorphic phases of edible surfactants as structuring agents in certain edible emulsions. It has been discovered that edible emulsions such as bread spreads, e.g., butter substitutes, containing mesomorphic phases can be improved by incorporation of certain sugars, particularly lactose. In a particularly advantageous embodiment, the addition of the sugar is combined with the removal of dairy ingredients other than lactose, which tend to buffer the composition. With this combination a better tasting, less acidic spread can be achieved.

Among spreads, the invention is of particular utility for spreads which are flavored so as to imitate butter (e.g., as opposed to say chocolate flavored spreads) since spreads suitable as butter substitutes generally do not include large amounts of sugar.

With respect to the use as fat replacer the present invention can provide edible compositions which have a reduced calorific contents as compared to normal foodstuffs. The present invention allows for the possibility of preparing foodstuffs with fat-like properties, but with the use according to the present invention containing essentially no fat at all or a very low amount of e.g. less than 5 wt. %.

In recent years there have been several developments regarding so-called "fat replacers." Such materials are intended to have as far as practical the functional and sensorial properties of fats, but to have a reduced calorie content and, where possible, health benefits as compared to fats. Much effort has been spent in the development of new materials which have a fatty functionality but are poorly adsorbed or non-digestible in the human gut.

Amongst such "fat replacer" materials are the sugar fatty acid esters, originally used as lubricants but now proposed for use in foods. The use of these sugar fatty acid esters as fat substitutes in margarines is suggested in EP-A-020 421 (Orphanos et al.: to the Procter & Gamble Company). Such margarines have a "fatty" phase which one or more triglyceride fats and one or more fat-replacers mixed intimately or in mutual solution. Food products are also envisaged which contain no triglyceride but have a "fat" phase consisting essentially of one or more fat replacers. Further reference to edible fat replacers can be found in U.S. Pat. Nos. 4,005,195 and 4,005,196 and EP-A-223856, 236288 and 235836.

Other glyceride related lubricants, especially the so-called hindered polyols having no hydrogen at the beta-carbon, such as the pentaerythritols and related compounds have been proposed as fat replacers (see e.g. U.S. Pat. No. 4,927,659 to Nabisco Brands Inc.)

Fat replacers comprising proteinaceous materials have been described. However, it should be understood that because these materials are digestible, they do not have as marked a calorie reducing effect as the above mentioned fat replacers.

Few of these materials, such as the sucrose esters or hindered polyols have completely understood physiological effects. It is generally believed that further experimental work will be required before the physiological effects are fully determined. There remains a clear need for fat replacers which comprise materials of well-understood physiological effect.

It has been found that the mesomorphic phase of edible surfactants can be used as a fat-replacing food component with a fat-like functionality and a simple composition. The invention provides products having a fatty oral impression, a plastic rheology and an improved taste.

Their use as foaming agent stems from the capability of the mesomorphic phase to stabilize air cells. It leads to very stable foam structure with air cells surrounded by a continuous structure of mesomorphic phase. This allows for its use in all products where air stabilization is essential, such as low fat substitutes for whipped creams, ice-cream and creaming margarines.

Their use as egg white replacer results from the excellent foaming capability mentioned above. This allows for its use in all products where raw egg white is used for foaming, such as bavarois type of products and toppings. This is very important in view of the danger of salmonella infection of raw egg white.

Their use as preservative is ascribed to the enhanced microbial stability, caused by the limited size of the intervening water areas in mesomorphic phase systems, which hinders the outgrowth of microorganisms. For example, the size(spacing) of the intervening water layers in a mesomorphic phase which is a lamellar phase system containing 95% water is approximately 0.1 fm, which is far below the size (1 fm approx.) of the effective microorganisms.

Their use as lubricant is connected with the fatty functionality and the proper rheology of these materials, even at a high water content. Two aspects are considered to be important in this respect: the hydrophobicity of the aliphatic chains of the applied surfactant molecules and the induced flow properties, e.g. in case of the mesomorphic lamellar phase structure the bilayers of surfactant molecules are separated by layers of water and are thus free to slide in relation to each other with the water as the gliding plane.

Their use as consistency control agent is directly connected with the structuring capability. The desired rheological properties can be achieved by proper choice of experimental parameters, such as concentration of nonionic and ionic surfactant, shear, pH and electrolyte. An example of such an application is in the design of spoonable and pourable products.

Their use as moisture retention agent is connected with the enclosure of the water between aggregated surfactant molecules. The physical state of water in foods influence the physical, chemical and functional characteristics of foods and food components, by influencing the water transport and/or the water mobility and/or the water activity. Their use in foodstuffs allows the introduction of large amounts of "immobilized" water, which can be freed at a later stage.

Their use as flavour release agent is connected with the possibility to entrap flavours in the water phase c.q. the surfactant phase of the mesomorphic phase. The nature of the systems would lead to a controlled release of the applied flavours. Many controlled release delivery systems have been described in the literature, e.g. the use of liposomes. Those systems have to be prepared separately and have to be added to the foodstuff as an extra and only in a limited amount. The use in foodstuffs allows the addition of flavour to the food system as such with proper retention of flavour components.

The mesomorphic phase and its method of preparation is known to food scientists. In the "Lipid Handbook" of Gunstone, Harwood and Padley (Chapman and Hall, 1986) such phases are mentioned at page 227. Further detail may be found in "Food emulsions" of S. Friberg (Marcel Decker, 1976 at page 82).

Such mesomorphic phases may advantageously be formed by heating a mixture containing the edible surfactant and water to a temperature above the Krafft temperature, followed by cooling.

It should be noted further that the above mentioned Lipid Handbook mentions at page 227 the use of mesomorphic phases of saturated, distilled monoglycerides as additives for processed potatoes or cake emulsions. However, this application is used for aerating bakery batters and enhanced complexing with amylose in non-finished starch based products. In the former application the aerating effect is ascribed to the better distribution of the monoglycerides in the batter system and in the latter application the monoglycerides form insoluble complexes with amylose, responsible for the crumb softening effect in bread and the texture improving effects on potato products and pasta foods. The emulsifiers are added to the bakery products before baking and to the potato products before final processing and consequently there is no mesomorphic phase in the finished products. The use of mesomorphic phases in such preparation methods for cake batters and processed potatoes are not embraced within the scope of the present invention.

In a preferred embodiment of the invention the mesomorphic phase is a lamellar gel phase. These phases are particularly preferred, because they can include a sensational amount of water, e.g. 98 or even 99 wt. %, based on the mesomorphic phase of edible surfactant and water.

Another preferred element of the present invention is the presence of bulk regions of mesomorphic phases in food products. Most preferred is the presence of bulk regions of mesomorphic lamellar phases. Bulk phases preferably consist of either a more or less continuous mesomorphic phase or of discrete particles of mesomorphic phase, for example having a number average particle size of between 1 fm and 1,000 fm. In this respect it should be noted that it has been suggested that known products of the prior art might contain non-bulk boundary layers of the lamellar phase at o/w interfaces, such as those found around oil droplets in water-continuous fatty products. The bulk regions of mesomorphic phase of edible surfactants may advantageously be used for replacing the aqueous phase and/or oil phase in food products in accordance to the invention.

Preferably food products in accordance with the invention contain at least 5% by volume of mesomorphic phase of edible surfactant, more preferred 10–100% by volume, for example 20–80% by volume, whereby the volume of the mesomorphic phase refers to the volume of the combined water/edible surfactant system.

DETAILED DESCRIPTION OF THE INVENTION

According to the present invention any edible surfactant may be used although lipidic substances are preferred. However, the use of other, non lipidic surfactants, for example surfactant or amphiphylic carbohydrates is not excluded. In general the preferred edible surfactants are selected from the group consisting of nonionic surfactants, anionic surfactants and cationic surfactants.

Preferred non-ionic surfactants are edible monoglycerides, diglycerides, poly-glycerol esters, nonionic phospholipids, non-fatty carboxylic acid esters of fatty acid esters, partial sugar-fatty acid esters and, partial fatty acid esters of polyols and mixtures thereof.

Preferred cationic surfactants are cationic phospholipids, cationic non-fatty carboxylic acid esters of fatty acid esters and mixtures thereof.

Preferred anionic surfactants are lactylated fatty acid salts, anionic phospholipids, anionic non-fatty carboxylic acid esters of fatty acid esters and their metal salts, fatty acids and their metal salts and mixtures thereof.

The fatty acid chains used in these surfactants can be of any type and origin. Preferably, however C8–28 fatty acid chains are present, more preferred C12–22, for example C14–18. The fatty acids may for example be saturated, unsaturated, fractionated or hydrogenated and be derived from natural (for example dairy, vegetable or animal) source or synthetic sources.

While foodstuffs according to the present invention can comprise a mesomorphic phase comprising 99–5 wt. % of water, it is preferred that the mesomorphic phase comprises 98–60 wt. % and in particular 97–80 wt. % of water, the percentages being based on the total weight of the mesomorphic phase. The total water level of products of the invention may for example be up to 99%, for example 10–90%, conveniently 20–80%.

Preferably the total level of edible surfactants in food products of the invention is from 0.1 to 30%, more preferred 1–15%, most preferred 2–10% by weight of the foodstuff.

Typical embodiments of the invention as illustrated hereafter by example comprise as the mesomorphic phase, in particular the bulk mesomorphic phase a combination of a major amount of a non-ionic surfactant and a minor amount of an ionic co-surfactant. Preferably, the mesomorphic phase comprises 1–30%, more preferred 2–10 wt. % of nonionic surfactant for example monoglycerides and 0.005–10% more preferred 0.01–1 wt. % of ionic co-surfactant for example an alkali metal salt of a lactylated fatty acid, preferably sodium stearoyl lactylate the percentages being based on the total weight of the mesomorphic phase.

The presence of "non-ionic", "cationic" and "anionic" surfactants is of course dependent on the pH-value of the foodstuff in which the surfactants are used. In this respect it should be noted that normally the pH for foodstuffs is between 3–8, for dairy products the pH-value is in the range of 4–7.

The combination of non-ionic and ionic surfactants is preferred because the ionic surfactants are believed to give rise to an electrical charge at the interface of the mesomorphic structure used according to the present invention. The mutual repulsion at the interface of surfactant and water in the mesomorphic phase, for example the lipid bi-layers in a mesomorphic lamellar structure, creates a layer structure in which a surprisingly large amount of water can be incorporated. This phenomenon allow for the use as edible fat replacer and water retention agent as attractive applications.

Preferably the nonionic surfactant and the ionic surfactant are used in weight ratios of from 100:1 to 1:10, more preferred 50:1 to 1:1, for example 40:1 to 10:1.

Preferred non-ionic surfactants are monoglycerides, lactylated esters of monoglycerides and phospholipids. Preferred ionic co-surfactants are alkali-metal salts of lactylated fatty acids, e.g. sodium stearoyl lactylate (SSL), citric acid esters, ionic phospholipids (phosphatidic acid (PA), succinated esters and diacetyl tartaric acid ester of monoglyceride (DATEM).

Especially in the presence of the alkali metal salt of a lactylated fatty acid, a monoglyceride-based mesomorphic system can take up a large quantity of water into the inter-planar water layers, and this 'swelling' of the emulsion improves suitability of the products as edible fat replacers. While the invention will be illustrated hereafter by reference to examples in which the surfactant system comprises both monoglyceride and SSL, the use of other, single surfactants or preferably combinations of two or more surfactants to obtain a swellable mesomorphic system is not hereby excluded.

While foodstuffs according to the invention generally will comprise less than 80% by weight of fat, the preferred level of this ingredient is 0–79 wt. % fat, for example 0 to 40%, preferably 1–30%. In some products a low fat content may be required as a flavour carrier.

Surprisingly it has also been found that the mesomorphic phase, which is used according to the invention, can be used in foodstuffs containing electrolyte, without affecting the structuring capability of the system. One example of electrolytes that may be incorporated is sodium chloride. The amount of electrolytes such as salt in foodstuffs according to the invention preferably ranges from about 0.01–5 wt. %, more preferred 0.1 to 3%, for example 0.2 to 2% based on the total weight of the finished food product.

The mesomorphic phases of edible surfactants, which are used according to the present invention, can be used in foodstuffs containing a bio-polymer such as carbohydrates e.g. pectins, rice starch, other starches and carrageenan, or proteins. Suitable materials are for example milk protein, gelatin, soy protein, xanthan gum, locust bean gum, agar, hydrolysed starches (for example PaselliSA2 and N-oil), microcrystalline cellulose. Especially preferred is the use of these biopolymer materials in spreads according to the invention. However, as explained below, the amount of dairy protein available to buffer the composition is preferably limited.

The amount of biopolymer in compositions of the invention is dependant on the desired degree of gelling and the presence of other ingredients in the composition. Usually the amount of gelling agent lies between 0 and 30%, mostly between 0.1 and 25% based on the weight of the aqueous phase of the product. If hydrolysed starches are present their level is preferably from 5–20%; other gelling agents are generally used at levels of up to 10%, mostly 1–7%, most preferred 2–5% all percentages being based on the weight of the aqueous phase. Particularly preferred are combination of say 5–15% hydrolysed starch and 0.5–5% of other gelling materials. Preferably the other gelling material includes gelatin.

It is preferable that fat and mesophase containing foodstuffs should comprise less than 10% saturated fat or equivalent thereof on product and/or less than 10% trans fat or equivalent thereof on product. Embodiments of the invention include sunflower oil based spreads which containg no added 'hardstock' components. These 'hardstock' components include saturated fats and trans fats of which the overall dietary intake should be reduced.

Examples of edible emulsions in which the present invention including mesomorphic phases of edible surfactants may be used, are spreads, in particular zero- or extremely low fat spreads (which contain less than about 20% of fat), toppings, sweet spread, pastry margarines, and sauces.

For preparing food-products containing the mesomorphic phase in accordance with the invention, it is possible to prepare the mesomorphic phase separately and add this phase an ingredient to the other ingredients of the product, or it is possible to prepare the mesomorphic phase "in-situ" in the presence of one or more other ingredients of the composition. In any case, however, the preparation of the mesomorphic phase preferably takes place while heating to a temperature above the Krafft temperature, followed by cooling. Generally these temperatures are from 0°–100° C., more general 30°–90° C., most general 40°–70° C. Any heat-sensitive ingredients or ingredients which could prevent the formation of a mesomorphic phase are preferably added after cooling.

The invention will be further illustrated by means of a number of specific embodiments: it will be evident that the scope of the invention is not limited to these specific embodiments.

Spreads

A preferred embodiment of the invention is the use of mesomorphic phases of edible surfactants, as generally specified in the above, in spreads. Suitable uses are as structuring agent, fat replacer, egg replacer, preservative, lubricating agent, consistency control agent, moisture retention agent and flavour release agent. Especially preferred is their use in spreads as a fat replacer, flavour release agent, consistency control agent or preservative.

Spreads according to the embodiment generally contain from less than 80% by weight of edible triglyceride materials. Suitable edible triglyceride materials are for example disclosed in Bailey's Industrial Oil and Fat Products, 1979. In spreads of non-reduced fat content (margarines), the level of triglyceride material will generally be more than 60% and less than 80%, preferably from 70 to 79% by weight. In spreads of reduced fat content the level of triglycerides will generally be from 30–60%, more general from 35 to 45% by weight. In very low fat spreads the level of triglycerides will generally be from 0–40%, for example 30%, 25%, 20% or even 10% or about 0%. Other fatty materials, for example sucrose fatty acid polyesters may be used as a replacement for part or all of the triglyceride material.

The edible surfactant material for use in spreads is preferably used at a level of from 0.1 to 15%, more preferred from 1–10%, most preferred from 2 to 8% by weight. Preferably the level of nonionic edible surfactant is from 0.1 to 15%, most preferred, 1–10%, most preferred, 2 to 8% by weight. Especially preferred are monoglycerides and lecithins as nonionic edible surfactants. Preferably the level of ionic edible surfactant is from 0 to 5%, more preferred 0.05 to 2%, most preferred 0.1 to 0.5%. Preferred ionic edible surfactants are lactylated fatty acid salts and phophatidic acid.

Monoglycerides for use in spreads are preferably freshly made so as to have a good taste.

The spreads of the invention include from 0.1% to 5% by weight of lactose, preferably from 0.5 to 2%, especially from 0.7 to 1.2%.

Preferably, the compositions lack substantial amounts of dairy ingredients other than lactose. Therefore, the compositions preferably include less than 1%, especially less than 0.5%, more preferably less than 0.1% and most preferably 0% dairy ingredients other than lactose. Dairy ingredients include proteins and salts such as phosphates, which are capable of buffering the composition. Such buffering tends to increase the requirements for addition of acid to reach a pH for microbiological stability. Dairy ingredients which should be limited include whole milk, skim milk, buttermilk, partially defatted milk, filled milk, casein, alkali metal caseinates, whey proteins, nonfat milk solids, milk salts and the like. Some buffering as in the form of gelatin proteins can be tolerated. In order to minimize the inclusion of milk and other proteins available to buffer the compositions, it is best to add lactose as lactose rather than as milk solids.

In addition to the above mentioned ingredients, spreads in accordance with the invention may optionally contain further ingredients suitable for use in spreads. Examples of these materials are gelling agents, additional sugar or other sweetener materials, EDTA, spices, salt, bulking agents, flavouring materials, colouring materials, proteins (subject to the qualifications given above), acids etc. Biopolymers are often useful ingredients in spreads. Suitable biopolymer materials are for example milk protein, gelatin, soy protein, xanthan gum, locust bean gum, hydrolysed starches (for example PaselliSA2 and N-oil), rice starch and microcrystalline cellulose. Some protein in gelled particles in the so-called "filled gel" compositions described below can be tolerated in the present compositions.

The amount of biopolymer in spreads of the invention is dependant on the desired degree of gelling and the presence of other ingredients in the composition. Usually the amount of gelling agent lies between 0 and 30%, mostly between 0.1 and 25% based on the weight of the aqueous phase of the spread. If hydrolyzed starches are present their level is preferably from 5–20%; other gelling agents are generally used at levels of up to 10%, mostly 1–7%, most preferred 2–5% all percentages being based on the weight of the aqueous phase. Particularly preferred are combination of say 5–15% hydrolysed starch and 0.5–5% of other gelling materials. Preferably the other gelling material includes gelatin. Preferably the amount of gelatin present is limited to about 6% or less of the aqueous phase. Indeed, the total buffering capacity of the spread is preferably limited to that which is equivalent to that of 6% or less gelatin based on the aqueous phase.

The balance of the composition is generally water, which may be incorporated at levels of up to 99.9% by weight, more general from 10 to 98%, preferably from 20 to 97% by weight. Spreads according to the invention may be fat and/or water continuous.

The mesomorphic phase can be used as a partial or entire replacement for the water phase and/or oil phase in the spread products.

In the preparation of spreads in accordance with the invention, the mesomorphic phase may either prepared before the addition of other ingredients, or the mesomorphic phase may be prepared "in-situ" while other ingredients of the composition are present. In any case however, the formation of the mesomorphic phase, preferably involves the heating of the edible surfactants and water to a temperature above the Krafft temperature. Therefore, heat-sensitive ingredients or ingredients which could prevent the formation of mesomorphic phase, should preferably be added after the formation of the mesomorphic phase.

In general the method for preparing spreads according to the invention involves the mixing of the edible surfactants (preferably a mixture of a non-ionic surfactant and a co-surfactant) and water to a temperature just above the Krafft-temperature of the system. Other ingredients, e.g. salt, colouring agents and flavouring ingredients can also be added. The pH can be set to the desired value using e.g. sodium hydroxide or lactic acid. This mixture is then stirred gently until the components are distributed homogeneously. Subsequently the formed mesomorphic phase is cooled down, generally while applying shear. This results in a low calorie plastic spreadlike gel phase with oral properties similar to high- and reduced fat spreads. The fat ingredient of the spread, if any, is preferably added after cooling and mixed into the product under stirring to effect the desired structure formation. Sweet spreads may be prepared accordingly.

Where gel-forming ingredients in addition to the mesomorphic phase are to be used it may be advantageous to prepare the spread using a split stream process in which a "filled gel" is ultimately formed. In a filled gel split stream process, the mesomorphic phase is formed in one stream and a phase including gelled particles is formed in a second stream, after which the two streams are combined. The gelled particles maintain their individual gelled structures after combination with the mesomorphic phase so that the gelled particles in the second stream become embedded in and "fill" the gelled mesomorphic phase.

A filled gel may also be formed by adding gel particles to the surfactant and other ingredients prior to the formation of the mesomorphic phase if the gelled particles are formed from heat-stable gels. For instance, a slurry of gel particles made from heat stable gels such as agar or certain pectins could be added to the ingredients from which the mesomorphic phase is to be formed and the mixture heated and then cooled to form the mesomorphic phase. Provided that the temperature used does not exceed the maximum temperature at which the heat stable gelling agents form gels, the gelled particles retain their identity and a filled gel is obtained.

It has been found that filled gels are advantageously used to form spreads having a minimal amount of surfactant, e.g., less than about 3%, especially down to levels of around, e.g., 1.5%. Thus, where the surfactant is a fatty substance such as a monoglyceride, use of filled gels permit an even further decrease in the fat level. Preferably, the gelled particles are from 1–100 microns, especially from about 10 to about 50 microns.

Other Food Products

Other food products in accordance with the invention which could advantageously contain a mesomorphic phase of edible surfactants, involve other edible emulsified systems, sauces, toppings, etc.

EXAMPLES

The invention will be illustrated by means of the following examples:

All percentages in the examples are by weight of the composition unless indicated otherwise.

The following ingredients were used:

The surfactants named Hymono and Admul followed by a code all are trade names of Quest International. The various types of Beta-carotene were obtained from Hoffmann-La Roche Ltd, Basel, Switzerland. BMP is butter milk powder. SMP is skimmed milk powder. Salt is sodium chloride. DATEM is Admul Datem 1935.

Examples I.A–I.D

Example A; Separate Preparation of Mesomorphic Phase

A mesomorphic phase of edible surfactant was made of the following ingredients:

| | |
|---|---|
| distilled water | 93.7% |
| monoglycerides (*) | 6.0% |
| Lactylated fatty acid (**) | 0.3% |

Notes:
*Hymono 1103 (ex Quest Int.)
**Admul SSL 2004 (ex Quest Int)

The water was heated in a water-jacketed vessel until a temperature of 65° C. At that point all other ingredients were added to the water and the mixture was stirred gently, using a 'ribbon stirrer', for about 30 minutes The pH of the product was set to a value of 4.6 using lactic acid. The product was cooled to ambient temperature.

The resulting product was a mesomorphic phase. The product could be used in the preparation of finished or ready to eat food products in accordance to the invention.

Example B; Separate Preparation of Mesomorphic Phase

A mesomorphic phase was prepared with the following composition:

| Monoglyceride (*) | 7% |
| Sodium Stearoyl Lactylate (**) | 4% on mono. |
| Water | to 100% |
| Colour/Flavour | trace |

Notes
* = Hymono 1103
** = Admul SSL 2004

All ingredients were-hand blended at 65° C. and the blend was neutralised with sodium hydroxide solution to pH 7.0. The resulting mixture was cooled to 10° C. The resulting product was believed to be a mesomorphic phase.

Example C; Separate Preparation of Mesomorphic Phase

A mesomorphic phase was prepared with the following composition:

| Tap water | 92.3% |
| Monoglycerides | |
| saturated (Hymono 8903) | 4% |
| unsaturated (Hymono 7804) | 3% |
| Co-surfactant (Admul DATEM 1935) | 0.7% |

The water was heated until 55° C. on an electric heating plate equipped with a magnetic stirring facility. At 55° C. the surfactants were added to the water and mixed using the magnetic stirrer, until distributed homogeneously (about 75 minutes). Then the mesomorphic phase was slowly cooled down to room temperature under continuous stirring.

In this way a plastic gel phase was obtained which did not show phase separation upon storage or spreading. The gel phase gave a distinct fatty oral impression.

Example D; Separate Preparation of Mesomorphic Phase

A bulk mesomorphic phase was prepared with the following composition:

| Hymono 1103 | 5% |
| SSL (Admul SSL 2004) | 4% on mono |
| water | balance |
| colour/flavour | trace |

The amount of SSL is equivalent to 0.2% by weight of the product. All ingredients were mixed together in a stirred water jacketed vessel at 65° C., and neutralised with sodium hydroxide to pH 7.0.

Example II; Spreads

Examples II.1–II.25 exemplify spreads generally made with mesomorphic phases. Example II.26 exemplifies spreads specific to the present invention.

Example II.1

A mesomorphic phase was prepared as in example D. After neutralisation a process stream of the neutral blend was drawn from the vessel and fed into a single VOTATOR (RTM) "A-unit" operating at a shear (2000 rpm at lab scale). The jacket temperature of the A-unit was 5° C. and the outlet temperature of the process stream was 10° C. The product was packed into tubs and stored at 5° C.

On inspection the product had the appearance of an edible fatty spread both when static and when spread onto bread. There was no evidence of loose moisture in the product even after some storage. The organoleptic properties of the zero-fat products so obtained were described as "spreadlike," although the product comprised over 90% of water.

Example II.2

Example II.1 was repeated with the addition of 20% wt fat on the final product. The fat was introduced into the process stream prior to the "A-unit." A range of fat phases otherwise employed in edible spreads were used, as was pure sunflower oil. Product again were described as 'spreadlike' when sampled. A specific advantage of the use of sunflower oil is that the eventual product, while being spreadlike, contains very low levels of trans fats and relatively low levels of saturated fats.

Example II.3

A mesomorphic phase of the composition as indicated as in example B was prepared by mixing the ingredients together in a stirred water-jacketed vessel at 65 ° C. and the blend was neutralised with sodium hydroxide solution to pH 7.0. Separately a water-phase was prepared containing 0.6% wt of salt (sodium chloride) and 1% sodium caseinate at a pH of 4.5. A process stream of the neutral blend was drawn from the vessel and fed into a single VOTATOR (RTM) "A-unit" operating at a shear (2000 rpm at lab scale). The jacket temperature of the A-unit was 5° C. and the outlet temperature of the process stream was 10° C. The process stream was then blended with the water phase in a weight ratio of 5:1 of mesomorphic phase to water-phase and fed into a Votator (RTM) "C-unit" wherein the two streams were mixed. The eventual product emerging from the C-unit was packed in tubs and stored at 5° C.

On inspection the product again had the appearance of an edible fatty spread both when static and when spread onto bread. There was again no evidence of loose moisture in the product even after some storage. The organoleptic properties of the zero-fat product so obtained were again described as 'spreadlike'.

Example II.4

Example II.3 was repeated under identical conditions except that the mixing ratio of the water-phase to mesomorphic phase was 1:3 by weight. This produced an acceptable 0% fat spread with no loose moisture and good organoleptic properties.

Example II.5

The mesomorphic phase as produced in example B was hand-blended at ambient temperature with commercially available chocolate spread in a weight ratio of 1:1. The resulting sweet-spread product was found to have acceptable organoleptic properties.

Example II.6

A mesomorphic phase was prepared as in example A. After heating and mixing the ingredients as described in example A, the mesomorphic phase was cooled using a scraped surface heat exchanger (Votator, A-unit) until a temperature of 12° C. The A-unit was operated at a throughput of 1 Kg/h and at high speed (2000 rpm). The products were packed in 250 g tubs and stored at 5° C.

The resulting product showed no loose moisture and could be spread easily on bread. Its organoleptic properties were very much like high- and reduced fat spreads, including a very distinct fatty impression. This product, however, contains only about 8% of the calories of a high fat spread (at equal volumes).

Example II.7

Example II.6 was repeated using the following composition:

| | |
|---|---|
| distilled water | 92.6% |
| monoglycerides (*) | 6% |
| sodium stearoyl lactylate (**) | 0.4% |
| Salt | 1% |
| Cold water soluble Beta-carotene and flavour | trace |
| Lactic acid | trace |

Notes
*Hymono 3203 ex Quest Int
**Admul SSL 2004 ex Quest Int

The processing as described in examples A and II.6 was used. This resulted in a zero fat spread with similar properties as the spread produced in example II.1 but for the fact that a distinct salty taste was obtained.

Example II.8

A zero fat spread was made using the following ingredients:

| | |
|---|---|
| Distilled water | 93.6% |
| Monoglycerides (Hymono 1103) | 6% |
| Co-surfactant (Admul SSL 2004) | 0.3% |
| Potassium sorbate | 0.1% |
| Cold water soluble (= CWS) Beta-carotene | trace |
| Flavour | trace |
| Lactic acid | trace |

The water was heated in a water-jacketed vessel until a temperature of 65° C. At that point all other ingredients were added to the water and the mixture was stirred gently, using a 'ribbon stirrer', for about 30 minutes. The pH of the resulting mesomorphic phase was set to a value of 4.6 using lactic acid.

Subsequently the mesomorphic phase was cooled using a scraped surface heat exchanger (Votator, A-unit) until a temperature of 12° C. The A-unit was operated at a throughput of 1 Kg/h and at high speed (2000 rpm). The products were packed in 250 g tubs and stored at 5° C. The resulting product showed no loose moisture and could be spread easily on bread. Its organoleptic properties were very much like high- and reduced fat spreads, including a very distinct fatty impression. This product, however, contains only about 8% of the calories of a high fat spread (at equal volume).

Example II.9

A zero fat spread was made containing salt by first preparing a spread as described in example II.8. To this spread 1 wt % of granular salt (NaCl) was added and mixed in by hand at 20° C., until homogeneously distributed. The physical and organoleptic properties of this spread were identical to the spread obtained in example II.8, but for the fact that a distinct salty impression was obtained upon eating the product. No grainy or sandy impression due to the granularity of the salt could be observed.

Example II.10

Example II.8 was repeated using the following composition:

| | |
|---|---|
| Distilled water | 92.6% |
| Monoglycerides (Hymono 3203) | 6% |
| Co-surfactant (Admul SSL 2004) | 0.4% |
| Salt | 1% |
| CWS Beta-carotene and flavour | trace |
| Lactic acid | trace |

The pH was set, using lactic acid, to a value of 4.2 No further changes to the processing as described in example II.8 were made. This resulted in a zero fat spread with similar properties as the spread produced in example II.8, but for the fact that a distinct salty taste was obtained.

Example II.11

A high PUFA (poly-unsaturated fatty acid) very low fat spread was prepared by first making a zero fat spread as described in example II.8. Subsequently, at 20° C., 6 wt % of sunflower oil was added to the spread and mixed until homogeneously distributed in the gel phase using an electric household mixer, operating at low speed.

The properties of the product were as described in example II.8, with an additional flavour sensation due to the sunflower oil present. This product can be marketed as a high PUFA spread in conjunction with the usual health claims for this type of products.

Example II.12

An all vegetable very low fat spread containing about 10% triglyceride materials was produced using the dual-line processing technique. In one water-jacketed vessel the following ingredients were mixed at 65° C.:

| | |
|---|---|
| Tap water | 95.1% |
| Monoglycerides (Hymono 8803) | 4% |
| Co-surfactant (Admul SSL 2012) | 0.3% |
| Salt | 0.5% |
| CWS Beta-carotene (ex Roch) | trace |
| Flavour | trace |
| Sodium sorbate | 0.1% |

In a second water-jacketed vessel a fat phase (Bean-oil blended with partly hydrogenated bean oil with a melting point of 36° C.) was heated to 45° C. Both, the water- and the fat phase were processed using separate Votator A-units. The water phase was processed under high shear conditions (2000 rpm) and cooled to a temperature of 12° C. The fat phase was processed under medium shear conditions (1000 rpm) and cooled to 20° C. The throughput of the water phase was 2.5 Kg/h and of the fat phase 0.3 Kg/h. After both A-units a single mixing unit (C-unit) was placed in which the water- and fat phase were homogeneously mixed under low shear conditions (250 rpm). The final product left the C-unit at a temperature of about 17° C. The product was subsequently packed in 250 ml tubs and stored at 5° C. The product thus obtained was stable, did not show loose moisture upon storage or spreading and had good organoleptic properties.

Example II.13

A bi-continuous very low fat spread containing 20% triglyceride materials was made using the following method:

A gel phase was made using the method as described in example C, and of the following composition:

| | |
|---|---|
| Tap water | 92.4% |
| Monoglycerides (Hymono 8803) | 7% |
| Co-surfactant (Admul SSL 2003) | 0.5% |
| Na-benzoate | 0.1% |
| CWS Beta-carotene | trace |
| Flavour | trace |

This product was packed and stored at 5° C. for one day. A commercial low fat spread was bought on the Dutch market, i.c. Latta. This is a fat continuous product which contains 40% fat. The dispersed water phase contains both gelatin and milk proteins as well as salt.

Both products were hand mixed at 20° C. and a weight ratio of 1:1 until a homogeneous product was obtained. Microscopical analysis of the product showed it to be bi-continuous in both the fat phase and mesomorphic phase. The product was physically stable, well spreadable and with organoleptic properties similar to the original low fat spread used.

Example II.14

A low fat spread, containing 40% triglyceride materials, was made in a way similar to the one described in example II.13. In this example the Dutch Latta was replaced by the commercially available (in Germany) high PUFA margarine Becel. This is a 80% triglyceride material, fat continuous product which contains no bio-polymers in the water phase. At least 60% of the fat phase consists of polyunsaturated fatty acids. The gel phase and margarine were mixed at a weight ratio of 1:1 using an electric hand-held household mixer, operating at low speed. During mixing the temperature was kept between 18° and 22° C.

The resulting product was fat continuous, as could be shown by light microscopy and electrical conductivity measurements. The product was physically stable and well spreadable. The organoleptic properties resembled those of spreads of a high polyunsaturated fat content. Similar results may be obtained by replacing German Becel by butter.

Example II.15

A zero fat spread containing gelatin was made using the following procedure. In a water-jacketed vessel the following ingredients were mixed at 65° C.:

| | |
|---|---|
| Tap water | 95.2% |
| Monoglycerides (Hymono 1103) | 3% |
| Co-surfactant (Admul SSL 2004) | 0.2% |
| Salt | 0.5% |
| Gelatin | 1.0% |
| Na-benzoate | 0.1% |
| CWS Beta-carotene, flavour | trace |

The pH was set to 5.0 using lactic acid. The mesomorphic phase thus obtained was processed using a Votator A-unit (1500 rpm, Tex=12° C., 2.5 Kg/h) followed by a low speed C-unit (100 rpm). After packing the product was stored at 5° C. The product was stable and spreadable. The oral response was fatty, combined with quick oral break-down characteristics.

Example II.16

Example II.15 was repeated with the following ingredients:

| | |
|---|---|
| Tap water | 92.2% |
| Monoglycerides (Hymono 1103) | 5% |
| skimmed milk powder | 1% |
| Co-surfactant (Admul SSL 2004) | 0.2% |
| Salt | 0.5% |
| Gelatin | 1.0% |
| Na-benzoate | 0.1% |
| CWS Beta-carotene, flavour | trace |

The final product differed from the one made by example II.15 that the appearance was more white and less translucent. The taste contribution of the milk-proteins (and lactose) could clearly be observed in the final product.

Example II.17

A pasteurized zero fat spread of identical composition as example II.16 was made. This was done by first making a mesomorphic phase in which all ingredients are homogeneously mixed at 65° C. Then the emulsion is led through a tubular heat exchanger in which the mesomorphic phase is heated to 80° C. for a period of 45 seconds. Subsequently the emulsion is cooled down to 65° C. using a second tubular heat exchanger and processed using a Votator A-unit.

The product was packed under 'sterile' conditions using a lamellar flow cabinet and pre-sterilised tubs of 250 ml. Microbiological examination of the product one month after production did not show any micro-biological activity.

Example II.18

A split stream zero fat product containing bio-polymers was made using the following ingredients:

In one water-jacketed vessel the following ingredients were mixed:

| | |
|---|---|
| Tap water | 91.4% |
| Monoglycerides | |
| saturated (Hymono 8903) | 4% |
| unsaturated (Hymono 7804) | 3% |
| Co-surfactant (Admul SSL 2004) | 0.5% |
| Salt | 1% |
| Potassium sorbate | 0.1% |
| CWS Beta-carotene, flavour | trace |

In a second water-jacketed vessel the following ingredients were mixed:

| | |
|---|---|
| Tap water | 87% |
| Gelatin (acid, 250 bloom, ex PB) | 4% |
| Paselli-SA2 (ex AVEBE) | 8% |
| Salt | 1% |
| CWS Beta-carotene | trace |

Both water phases were first processed using a high shear Votator A-unit, after which the products were mixed in a subsequent C-unit (250 rpm, Tex=15° C.). The final product consisted for 25% of the gel phase and for 75% of the biopolymer phase.

The final product consisted of a continuous mesomorphic phase in which the bio-polymer phase was finely and homogeneously dispersed. The product was plastic and spreadable with good organoleptic properties.

Example II.19

A very low fat spread containing 20% triglyceride materials was made in-line using the dual-line method. In one part of the processing line, consisting a water-jacketed vessel and a Votator A-unit a mesomorphic phase is prepared as described in example II.8. In another part of the processing line a low fat spread is made using a water-jacketed vessel, two subsequent A-units and a final C-unit. The composition of this phase is as follows:

| | |
|---|---|
| Tap water | 55% |
| fat phase (a blend of bean oil, partially hardend bean-oil and partially hardened palm oil) | 40% |
| Gelatin (acid, pigskin, 200 bloom ex PB) | 3% |
| BMP (acid type buttermilk powder, ex. Frico) | 1% |
| Salt | 1% |
| Beta-carotene, flavour | trace |

After processing the mesomorphic phase in the A-unit (high shear) and the water/fat phase in the A-A-C-sequence, both products are mixed in at a weight ratio of 1:1 using a medium speed C-unit.

The resulting product was bi-continuous in mesomorphic and fat phase. Its physical and organoleptic properties were similar to that of a conventional low fat spread having a triglyceride content of about 40%.

Example II.20

A chocolate spread was prepared by low shear mixing of a commercial chocolate spread (32% fat) with the same amount of mesomorphic phase at room temperature.
Ingredients:

gel phase (10% Hymono 8803, 0.4% DATEM, balance water) 50% chocolate spread (ex. Albert Heyn, fat 32%, protein 3%, carbohydrate 62%) 50%

A product with proper consistency and acceptable organoleptic properties was obtained with a considerably lower calorie intake per serving.

Example II.21

A low fat chocolate spread was prepared using the following ingredients:

| | |
|---|---|
| water | balance |
| Hymono 8803 | 5% |
| Admul SSL 2004 | 0.25% |
| cocoa powder (ex. de Zaan, D 21A) | 5% |
| saccharose | 30% |
| skimmed milk powder | 10% |
| salt | 0.2% |
| potassium sorbate | 0.2% |
| vanillin | 0.02% |
| lactic acid | trace |

All ingredients were heated in a water-jacketed vessel to 65° C. under gentle stirring for about 30 min. The pH was set at a value of 5.0 using lactic acid. Subsequently the liquid mass was cooled using a scraped surface heat exchanger to a temperature of 12° C. with a throughput of 1 kg/h and a rotor speed of 1850 rpm.

A product was obtained with proper consistency and acceptable organoleptic properties without fat (triglyceride).

Example II.22

A low fat chocolate spread was prepared with the same composition as example II.21, apart from the non-ionic surfactant Hymono 8803, which was replaced by Phopholipon 100H (ex Natterman). A product was obtained with proper consistency and proper organoleptic properties.

Example II.23

A margarine-like 2.75% fat filled gel spread was formed from 50% each by weight of a mesomorphic phase and an aqueous phase. The mesomorphic phase was formed from the following ingredients:

| | |
|---|---|
| Distilled monoglycerides, derived from fully hydrogenated palm oil | 5.15 |
| DATEM ester (PANODAN FPDK from Grindsted | 0.35 |
| Cold Water Soluble Betacarotene | minor |
| Water | 94.5 |

The mesomorphic phase was formed by heating water to 90° C., cooling it to 58° C., adding the monoglycerides and waiting 10 minutes as they dispersed. The DATEM was added and the mixture was stirred for 2 hours, while keeping the temperature between 50°–55° C. A homogeneous viscous mixture is obtained with an egg-white like consistency. The mixture was cooled at 30 kg/hr in a pilot plant A-unit at 800 rpm to/5° C. and sheared in a 0.7 l C-unit at 600 rpm where it exited at 16° C. Samples taken at this point set quickly to a margarine-like consistency. The pH of the mesomorphic phase was determined to be 3.0. The aqueous phase was formed from the following ingredients:

| | |
|---|---|
| gelatin | 4% |
| Remyrice AC (waxy rice starch) | 2 |
| Buttermilk powder | 4.7% |
| Salt | 2.4% |
| Potassium sorbate | 0.26% |
| Lactic acid | 0.25% |
| Flavor | 0.0048% |
| Water | 85.39% |

The mixture was heated to 60° C., pasteurized and fed at 30 kg/hr into a pilot plant A-unit at 700 prm and cooled to 12.6° C. The mixture was given residence time to gel under shear in a 3.2 l C-unit at 150 rpm. It exited at 17° C. The pH of the mixture was determined to be 4.8. the aqueous phase, now comprising a slurry of gelled particles, was combined with the mesomorphic phase in a static mixer. A portion of the product exiting from the static mixer was recirculated to the front of the mixer to ensure a homogeneous product. The exit temperature was 17° C.

The evolving spread had initially a soft, mayonnaise-like consistency, but hardened up to a very margarine-like consistency when during the first 9 days of storage the mesomorphic phase changed from the α-crystalline to the Beta-coagel state. The product consisted of a continuous mesomorphic phase in which gelatin/starch gelled particles are dispersed. The hardness at 5° C. was 200, the product was judged by an expert panel to have a very margarine-like consistency and a melting behavior comparable to that of a 40% fat spread.

Example II.24

Example II.23 was repeated, but the temperature of the aqueous phase before the mixing step was increased to 22° C. Only a minor part of the aqueous phase had gelled before mixing with the mesomorphic phase. The resulting product had a gelatin-pudding like consistency, indicating that the continuous phase now also contained substantial amounts of the gelling agents in the mesomorphic phase causing loss of its spread-like consistency. The product had a good melting behavior and a creamy mouthfeel.

Example II.25

Example II.23 was repeated, but the temperature in the tank, holding the mesomorphic phase was increased to 60° C. The Krafft temperature was 45° C. A phase split occurred and the mixture no longer was a homogeneous, viscous mesomorphic phase, but a thin, watery liquid containing little white spots. It is believed to consist of water in which a minor amount of a concentrated monoglyceride phase is dispersed.

After cooling, just before feeding into the static mixer, the consistency of the would-be mesomorphic phase was still very watery indicating that a mesomorphic phase had, in fact, not formed. The final product had a grainy, gelatin-pudding like structure and a sharp, watery mouthfeel.

Example II.26

Filled gel Formulations

The formulations below are made as follows:

Aqueous Phase

Ingredients are added to water as powders at about 65.5° C. and heated to 85.5° C. followed by cooling back to 65.5° C. Lactic acid is added to adjust the pH to 4.8. The mix is fed into a Votator A-unit rotating at 150 rpm. Upon leaving the A-unit the temperature is 5° C. The mixture is then fed to a Votator C-unit which is rotating at 100–150 rpm. The mixture is then combined with the lipogel phase.

Lipogel Phase

Powdered ingredients are added to 60.5° C. water. The mixture is agitated. The mixture is mixed until the powders are fully dissolved and held for one hour before use at 55°–58.5° C. The mixture is fed into an A-unit rotating at 780 rpm. The mixture leaves the A-unit at 5° C. and enters a C-unit which is rotating at 1000 rpm. The mixture is combined with the aqeuous phase.

The combined phases are mixed in a static mixture and leaves the mixer at a temperature of 10° C. The mixture is then packed or recycled, as necessary.

| | PERCENTAGE OF INGREDIENTS ON PRODUCT | | |
|---|---|---|---|
| | FL1 | FL2 | (comparison) FL3 |
| FAT PHASE | | | |
| sat'd dis Mono (Eastman) | 2.99 | | |
| sat'd dist Monogly (Quest) | | 2.99 | 2.99 |
| DATEM | 0.20 | 0.20 | 0.20 |
| water | 54.81 | 54.81 | 54.81 |
| CWS-beta carotene | 0.04 | 0.04 | 0.04 |
| FLAVORS | 0.26 | 0.304 | 0.334 |
| AQUEOUS PHASE | | | |
| gelatin | 1.67 | 1.67 | 1.67 |
| remyrise AC, rice starch | 1.26 | 1.26 | 1.26 |
| lactose | 0.84 | 0.84 | — |
| salt | 1.43 | 1.43 | 1.43 |
| K-sorbate | 0.11 | 0.11 | 0.11 |
| Lactic acid, 88% | 0.13 | 0.13 | 0.13 |
| water | 36.65 | 36.65 | 37.49 |

Comparison Formulation FL3 contains no added lactose. Products FL1, FL2 and FL3 are taste tested in an expert panel of approximately 8 people. The products are all very spread-like but the lactose-containing formulations are found to contain noticeably less off-flavor.

What is claimed is:

1. A finished foodstuff having bulk regions of a mesomorphic phase of edible surfactant which structures the foodstuff, less than 80% wt edible oil and lactose, cake batters not constituting finished foodstuffs, said surfactant being selected from the group consisting of edible monoglycerides, diglycerides, non-ionic phospholipids, non-fatty carboxylic acid esters of fatty acid esters, partial sugar-fatty acid esters, partial fatty acid esters of polyols, mixtures thereof, cationic surfactants, and anionic surfactants and mixtures thereof, said mesomorphic phase not being made from a cake batter incorporating mesomorphic phase emulsifiers.

2. The finished foodstuff according to claim 1 comprising at least 5% by volume of mesomorphic phase.

3. The finished foodstuff according to claim 1, comprising from 0.1 to 30 wt % of edible surfactant.

4. The finished foodstuff according to claim 1, comprising from 0.1% to 5% by weight lactose.

5. The finished foodstuff according to claim 4 wherein the product is a spread.

6. The spread according to claim 5 wherein the lactose is present at from 0.5 to 2% by weight.

7. The spread according to claim 6 comprising from 0–1% dairy ingredients other than lactose available to buffer the composition.

8. The spread according to claim 7 comprising 0–0.1% dairy ingredients other than lactose available to buffer the composition.

9. The spread according to claim 8 having substantially no dairy ingredients other than lactose available to buffer the composition.

10. The finished foodstuff according to claim 1 wherein the edible surfactant comprises a monoglyceride.

11. The finished foodstuff according to claim 1, comprising from 1 to 30% by weight of edible nonionic surfactants and from 0.005 to 10% by weight of edible ionic surfactant.

12. The finished foodstuff according to claim 1 selected from the group of toppings and spreads.

13. The finished foodstuff of claim 1 further comprising discrete gelled particles embedded in said mesomorphic phase.

14. The finished foodstuff according to claim 1 wherein the mesomorphic phase is a continuous phase.

15. The finished foodstuff according to claim 1 wherein the mesomorphic phase contains 80% or more of water.

* * * * *